No. 662,239. Patented Nov. 20, 1900.
J. MACPHAIL.
GRINDING WHEEL CENTER.
(Application filed Mar. 11, 1899.)
(No Model.)
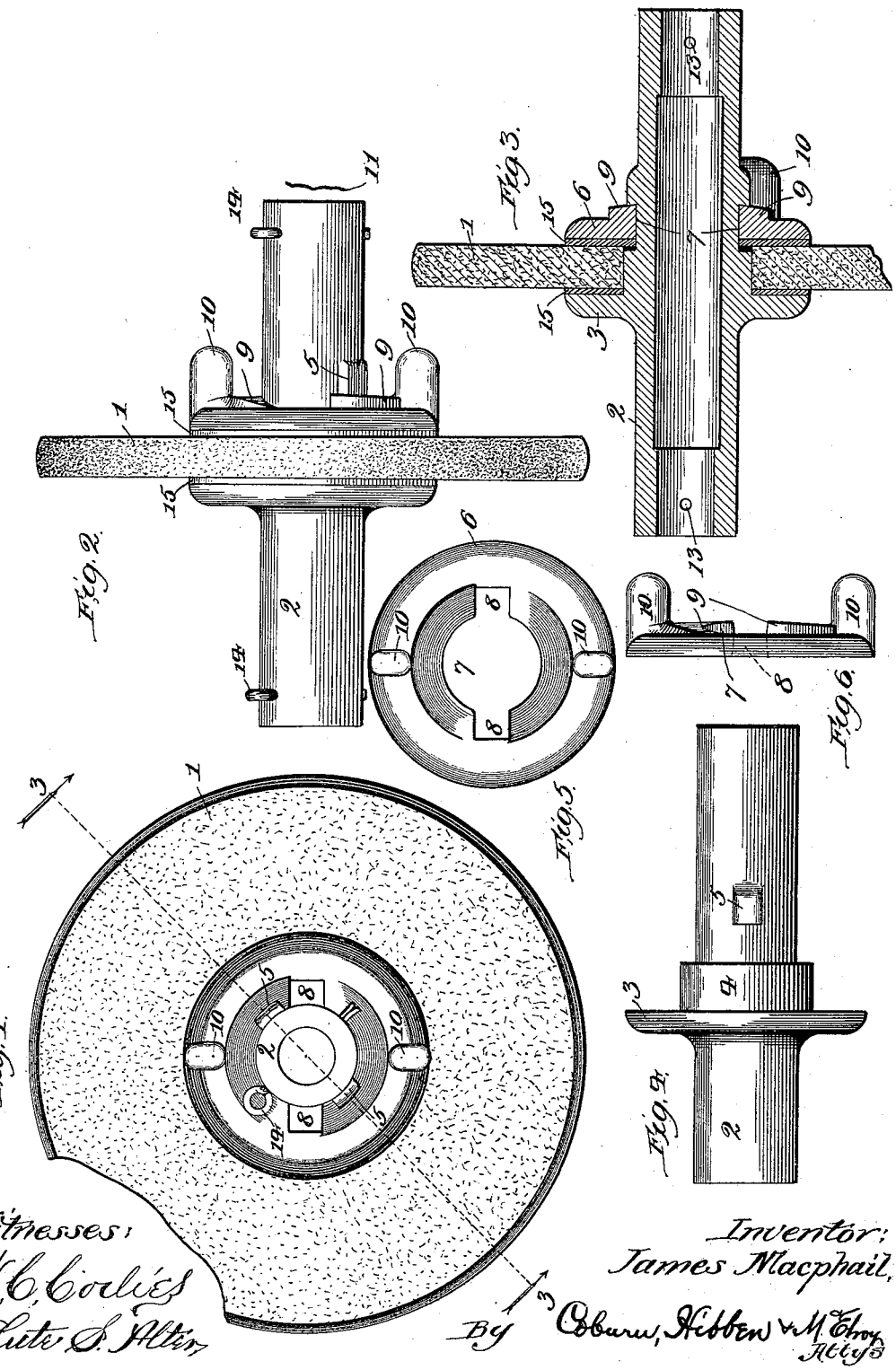
Witnesses:
Inventor:
James Macphail,
By Coburn, Hibben & McElroy
Attys

UNITED STATES PATENT OFFICE.

JAMES MACPHAIL, OF BLUE ISLAND, ILLINOIS, ASSIGNOR TO THE PLANO MANUFACTURING COMPANY, OF CHICAGO, ILLINOIS.

GRINDING-WHEEL CENTER.

SPECIFICATION forming part of Letters Patent No. 662,239, dated November 20, 1900.

Application filed March 11, 1899. Serial No. 708,740. (No model.)

*To all whom it may concern:*

Be it known that I, JAMES MACPHAIL, a resident of Blue Island, in the county of Cook and State of Illinois, have invented certain new and useful Improvements in Grinding-Wheel Centers, of which the following is a specification.

The object of my invention is to provide a novel, simple, and efficient grinding-wheel center comprising means for removably securing the grinding-wheel to its shaft or arbor, or to a sleeve to be removably attached to a driving-shaft.

My invention pertains to the many kinds and sizes of grinding-wheels—such as emery-wheels, common grindstones, and the like—and has useful application to those grinding-machines where it is necessary or desirable to quickly remove a grinding-wheel and substitute another on the same driving-shaft.

In the accompanying drawings, Figure 1 is a side elevation of a grinding-wheel with my attachment applied; Fig. 2, a front elevation thereof; Fig. 3, a section on line 3 of Fig. 1; Fig. 4, an elevation of the sleeve; Fig. 5, an elevation of the cam-nut, and Fig. 6 an edge-view thereof.

The grinding-wheel 1 may be of any desired kind. As shown, it is adapted to be removable from a sleeve as well as from the driving-shaft. This sleeve comprises a cylindrical portion or member 2, having toward its central portion a circular flange 3 and a hub 4. As illustrated in Figs. 2 and 3, this flange abuts one face of the wheel while the hub passes through a central opening in the wheel, the hub being of the same thickness as the wheel. The sleeve is also provided with a pair of lugs or projections 5.

The nut 6 has a central opening 7 to receive the cylindrical sleeve and also has a pair of oppositely-disposed slots 8 to pass over the lugs 5 and thereby cause the lug and nut to be pressed against the face of the wheel opposite to the flange 3. This nut on its outer face has a pair of curved cams 9 and also a pair of ears 10. The sleeve is adapted to be removably secured to the driving-shaft 11, which may be driven in any suitable manner, and to this end the shaft has one or more corresponding pin-holes 13, which receive cotter-pins 14 or the like. After the wheel is inserted on the sleeve the nut 6 is placed on the sleeve, the slots 8 allowing the nut to pass. By means of the ears 10 the nut is then turned to the right or left, depending upon whether the cams are formed right or left hand, whereupon the cams will ride up against the lugs 5 and thereby cause the nut to forcibly press against the wheel. Any suitable packing 15 may be used between the faces of the wheel and the parts of the attachment or center. To remove the wheel, the nut is turned in a reverse direction. To remove the wheel and sleeve from the shaft, the one or more cotters are removed and the shaft 11 then withdrawn.

While the holder or center may be made as shown, to secure the removability of the sleeve from the shaft, as well as of the wheel from the sleeve, it is obvious that when removability of the wheel alone is desired the sleeve part may constitute the shaft or arbor and may therefore be made otherwise than as a hollow cylinder.

Although I have described more or less precise forms and details of construction, I do not intend to be understood as limiting myself thereto, as I contemplate changes in form, the proportion of parts, and the substitution of equivalents as circumstances may suggest or render expedient, and without departing from the spirit of my invention.

I claim—

1. A grinding-wheel center or holder comprising a hollow sleeve having a flange, a grinding-wheel having a central hole to receive the sleeve and adapted to be forced against the flange, lugs on the sleeve, a cam-nut received on the sleeve and when rotated forced against the wheel by contact with the lugs, a driving-shaft or arbor and means on both sides of the wheel for removably attaching the sleeve and shaft, said means positively holding the parts whether the wheel is running or is at rest.

2. A grinding-wheel center or holder comprising a hollow sleeve having a flange, a grinding-wheel having a central hole to receive the sleeve and adapted to be forced against the flange, lugs on the sleeve, a cam-nut received on the sleeve and when rotated forced against the wheel, and a driving-shaft or arbor having a pin-hole, the sleeve having a corresponding pin-hole and a pin passing through both said holes.

3. A grinding-wheel holder comprising a sleeve 2 having a flange 3, a hub 4 and a pin-hole 13, lugs 5, a grinding-wheel 1 received on said hub, a nut 6 having a central opening 7 and side slots 8 to accommodate the lugs, cams 9 on the nut, a driving-shaft 11 having a pin-hole 12 and a pin 14 entering holes 12 and 13 to removably secure the sleeve to the shaft.

JAMES MACPHAIL.

Witnesses:
SAMUEL E. HIBBEN,
LOUISE E. SERAGE.